US012810409B2

(12) United States Patent
Matsushita et al.

(10) Patent No.: US 12,810,409 B2
(45) Date of Patent: Nov. 24, 2026

(54) LASER LIFT-OFF DEVICE, INFORMATION PROCESSING METHOD AND NON-TRANSITORY COMPUTER READABLE RECORDING MEDIUM

(71) Applicant: JSW AKTINA SYSTEM CO., LTD., Yokohama (JP)

(72) Inventors: Rei Matsushita, Kanagawa (JP); Kenichi Ohmori, Kanagawa (JP); Nobuo Oku, Kanagawa (JP); Tamotsu Odajima, Kanagawa (JP); Yuzaburo Ohta, Kanagawa (JP)

(73) Assignee: JSW AKTINA SYSTEM CO., LTD, Yokohama (JP)

( * ) Notice: Subject to any disclaimer, the term of this patent is extended or adjusted under 35 U.S.C. 154(b) by 79 days.

(21) Appl. No.: 18/701,237

(22) PCT Filed: Jul. 19, 2022

(86) PCT No.: PCT/JP2022/028013

§ 371 (c)(1),
(2) Date: Apr. 14, 2024

(87) PCT Pub. No.: WO2023/074065

PCT Pub. Date: May 4, 2023

(65) Prior Publication Data

US 2024/0420304 A1 Dec. 19, 2024

(30) Foreign Application Priority Data

Oct. 29, 2021 (JP) ................................ 2021-177938

(51) Int. Cl.
*G06T 7/00* (2017.01)
*B32B 43/00* (2006.01)

(52) U.S. Cl.
CPC .......... *G06T 7/0004* (2013.01); *B32B 43/006* (2013.01); *G06T 2207/20021* (2013.01);
(Continued)

(58) Field of Classification Search
CPC ......... G06T 7/0004; G06T 2207/20021; G06T 2207/20081; G06T 2207/30108;
(Continued)

(56) References Cited

U.S. PATENT DOCUMENTS

2011/0132549 A1* 6/2011 Sercel .................... B23K 26/40 156/753
2014/0251533 A1 9/2014 Lim et al.
(Continued)

FOREIGN PATENT DOCUMENTS

CN 109844918 A 6/2019
CN 110047770 A 7/2019
(Continued)

OTHER PUBLICATIONS

International Search Report for International Patent Application No. PCT/JP2022/028013, Aug. 30, 2022.
(Continued)

*Primary Examiner* — Alex B Efta
*Assistant Examiner* — Alexander S Wright
(74) *Attorney, Agent, or Firm* — Potomac Law Group, PLLC

(57) ABSTRACT

A laser lift-off device irradiating a work having a substrate and a separation layer formed on the substrate with laser light to separate the separation layer from the substrate comprises: an imaging device that takes an image of the work irradiated with laser light; and a processing unit that performs processing based on an image taken by the imaging device, and the processing unit acquires an image of a work taken by the imaging device, inputs the acquired image
(Continued)

of the work to a learning model that, if an image of a work is input, outputs information related to a state of a separation layer of the work, to derive information related to a state of the separation layer, and outputs the derived information related to the state of the separation layer.

8 Claims, 7 Drawing Sheets

(52) U.S. Cl.
CPC ............... *G06T 2207/20081* (2013.01); *G06T 2207/30108* (2013.01)

(58) Field of Classification Search
CPC ....... B32B 43/006; H10P 52/00; B32K 26/00; B32K 26/57
See application file for complete search history.

(56) References Cited

U.S. PATENT DOCUMENTS

2018/0366325 A1 12/2018 Norman et al.
2019/0220972 A1 7/2019 Iwanaga
2020/0022601 A1 1/2020 Rogers et al.
2020/0287356 A1* 9/2020 Kishimoto ........... B23K 26/034
2021/0364450 A1* 11/2021 Lauber ...................... G06T 5/50

FOREIGN PATENT DOCUMENTS

JP 2001-013079 A 1/2001
JP 2010-161285 A 7/2010
JP 2012-028740 A 2/2012
JP 2017-196665 A 11/2017
JP 2018-199163 A 12/2018
WO 2018/071137 A1 4/2018

OTHER PUBLICATIONS

Office Action issued Jun. 30, 2026, in Chinese Patent Application No. 202280072052.2.
Yin Sumin et al. "Testing Method of the Laser Scratching Based on Image Acquisition System", Chinese Journal of Lasers, vol. 35, No. 6, Jun. 15, 2008.

* cited by examiner

LASER LIFT-OFF DEVICE, INFORMATION PROCESSING METHOD AND NON-TRANSITORY COMPUTER READABLE RECORDING MEDIUM

CROSS-REFERENCE TO RELATED APPLICATION

This application is the national phase under 35 U.S.C. § 371 of PCT International Application No. PCT/JP2022/028013 which has an international filing date of Jul. 19, 2022 and designated the United States of America.

FIELD

The present disclosure relates to a laser lift-off device, an information processing method and a non-transitory computer readable recording medium.

BACKGROUND

A laser lift-off device has been known that irradiates a separation layer (work) formed on a substrate with a laser beam from the substrate-side and separates the separation layer from a substrate The known device emits light so that the adjacent irradiated regions overlap with each other while changing irradiated regions on the work from moment to moment (for example, refer to Japanese Patent Laid-Open Publication No. 2012-28740).

The known device just described does not, however, consider efficient derivation of information on the state of the separation layer which is irradiated with laser light.

SUMMARY

The present disclosure is made in view of such a circumstance, and an object is to provide a laser lift-off device or the like that can efficiently derive information on the state of a separation layer which is irradiated with laser light.

A laser lift-off device according to the present aspect irradiating a work having a substrate and a separation layer formed on the substrate with laser light to separate the separation layer from the substrate, comprises: an imaging device that takes an image of the work irradiated with laser light; and a processing unit that performs processing based on an image taken by the imaging device, and the processing unit acquires an image of a work taken by the imaging device, inputs an acquired image of the work to a learning model that, if an image of a work is input, outputs information related to a state of the separation layer of the work, to derive information related to a state of the separation layer, and outputs derived information related to the state of the separation layer.

An information processing method according to the present aspect causes a computer to execute processing of: acquiring an image of a work having a separation layer formed on a substrate that is irradiated with laser light; inputting an acquired image of the work to a learning model that, if an image of a work is input, outputs information related to a state of a separation layer of the work, to derive information related to a state of the separation layer; and outputting derived information related to the state of the separation layer.

A program according to the present aspect causes a computer to execute processing of: acquiring an image of a work having a separation layer formed on a substrate that is irradiated with laser light; inputting an acquired image of the work to a learning model that, if an image of a work is input, outputs information related to a state of the separation layer of the work, to derive information related to a state of a separation layer; and outputting derived information related to the state of the separation layer.

According to the present disclosure, it is possible to provide a laser lift-off device or the like that efficiently derives information on the state of the separation layer which is irradiated with a laser light.

DESCRIPTION OF EMBODIMENTS

First Embodiment

Figure 1:
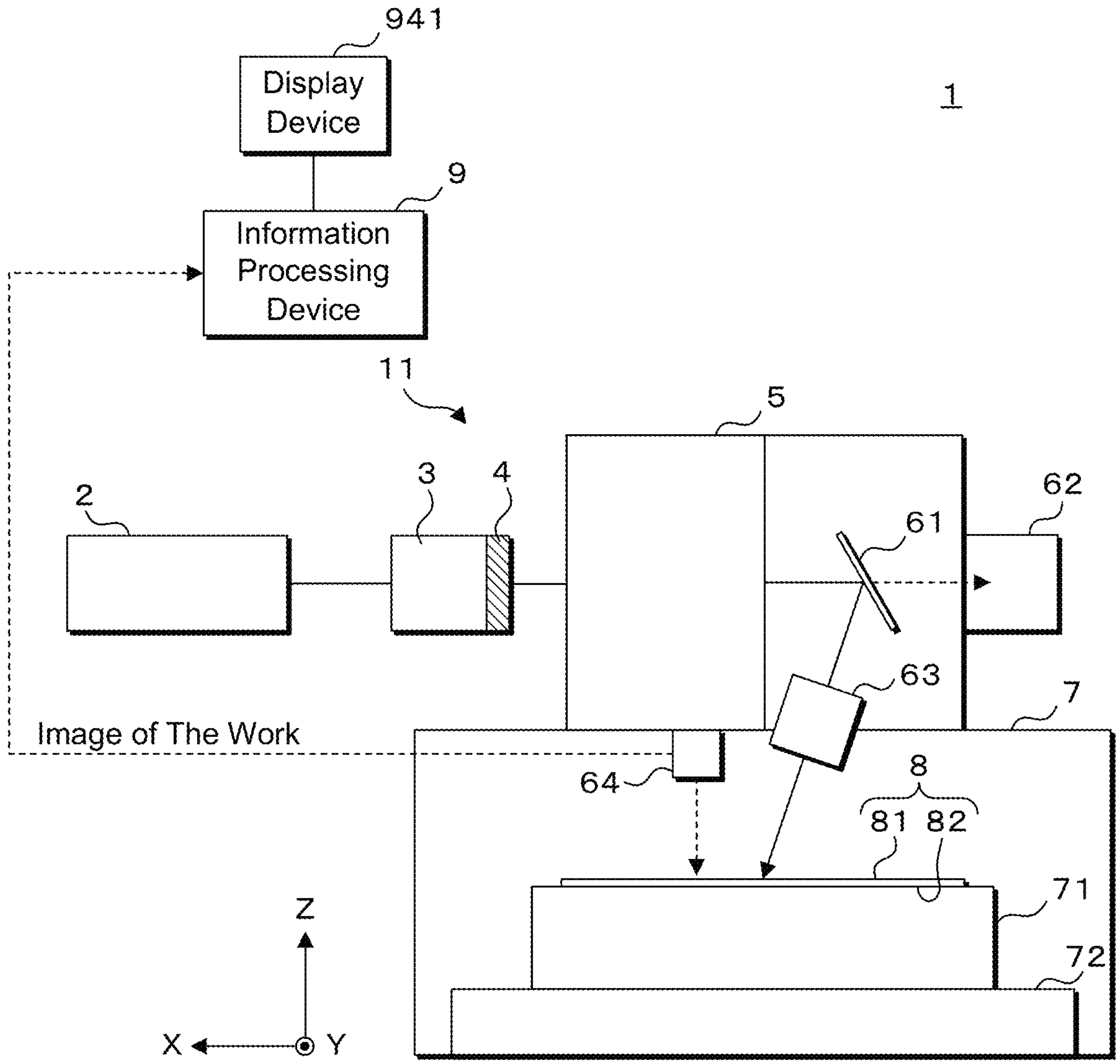
FIG. 1 illustrates an example of the configuration of a laser lift-off device according to a first embodiment.
Figure 2:
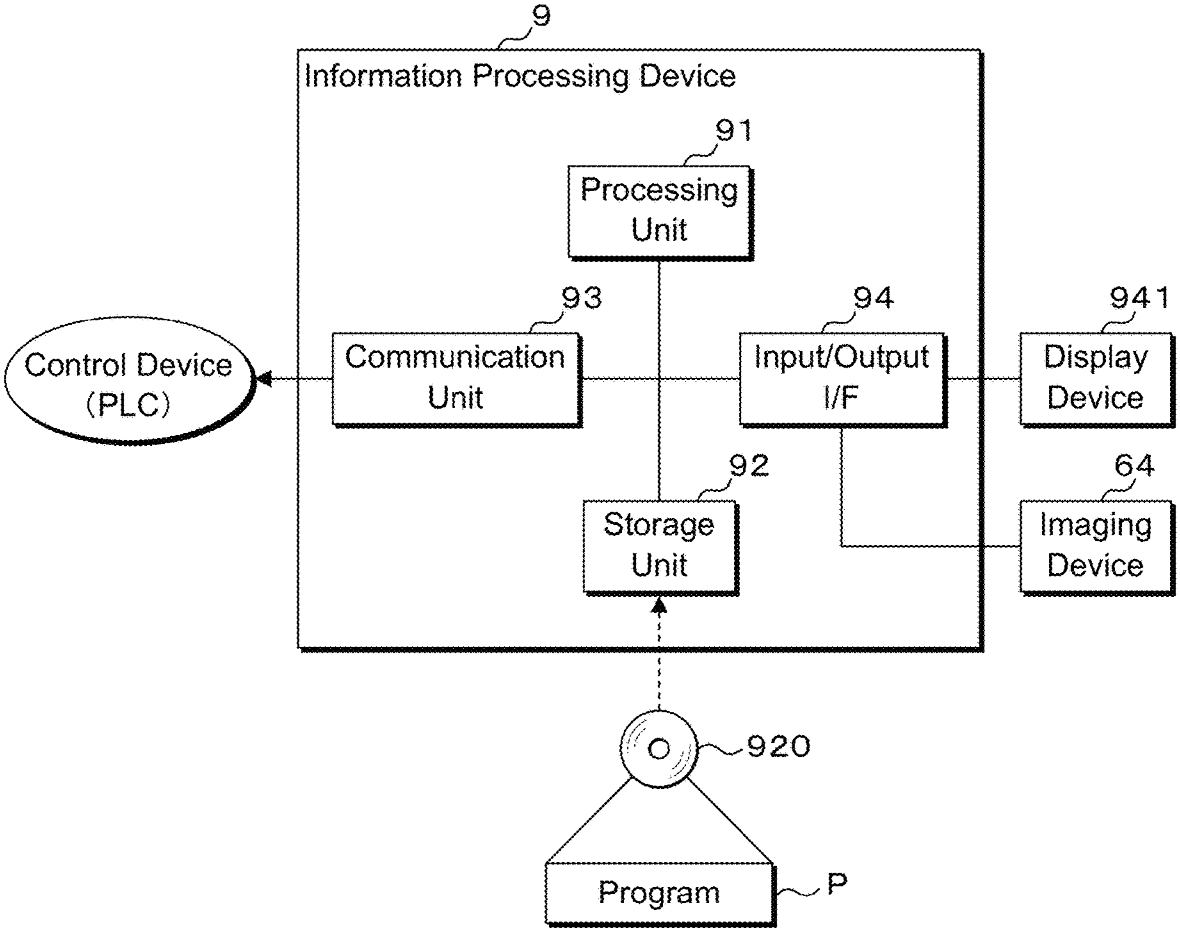
FIG. 2 illustrates an example of the configuration of an information processing device contained in the laser lift-off device.

An embodiment of the present disclosure will be described below. FIG. 1 illustrates an example of the configuration of a laser lift-off device 1 according to a first embodiment. FIG. 2 illustrates an example of the configuration of an information processing device 9 contained in the laser lift-off device 1. The laser lift-off device 1 is a device that irradiates a substrate 81 with a laser beam from the substrate 81 side to separate a separation layer 82 from the substrate 81 and is used for manufacturing an organic EL display, for example. The substrate 81 is a transparent substrate 81 such as a glass substrate 81, and the substrate 81 and the separation layer 82 formed on the underside of the substrate 81 make up of a work 8, on which laser lift-off (LLF) process by the laser lift-off device 1 is performed.

As illustrated in the drawings in the present embodiment, in an XYZ three-dimensional orthogonal coordinate system, a Z-direction corresponds to a vertical direction and a direction orthogonal to the substrate 81. An XY-plane corresponds to a plane parallel to a surface of the substrate 81 on which the separation layer is formed. For example, an X direction corresponds to a longitudinal direction of the substrate 81 having a rectangular shape while a Y direction corresponds to a lateral direction of the substrate 81. In the case of using a O-axis stage 71 rotatable from 0 to 90 degrees around the Z-axis, the X-direction may correspond to the lateral direction of the substrate 81 while the Y-direction may correspond to the longitudinal direction of the substrate 81.

The laser lift-off device 1 includes a laser optical system 11, a laser irradiation chamber 7 and the information processing device 9. The laser irradiation chamber 7 contains a base 72 and the stage 71 placed on the base 72. The laser lift-off device 1 irradiates the separation layer 82 with laser light while conveying the substrate 81 in a +X direction using the stage 71.

The laser optical system 11 includes a laser light source 2, an attenuator 3, a polarization ratio control unit 4, a beam shaping optical system 5, a vertical reflecting mirror 61 and a projection lens 63, and emits line-shaped laser light.

The laser light source 2 is a laser generation device that generates pulsed laser light as laser light for irradiating the separation layer 82. The laser light to be generated is, for example, gas laser light such as excimer laser light with a central wavelength of 308 nm. Alternatively, the laser light may be other gas lasers, not limited to the excimer laser light, but may be laser light of a solid-state laser. In the laser light source 2, a gas such as xenon is sealed in a chamber, and two resonator mirrors are disposed to face each other with the gas sandwiched therebetween. One of the resonator mirrors is a total reflection mirror that reflects the entirety of light, and the other resonator mirror is a partial reflection mirror through which a part of the light is transmitted. Gas light excited by a gas is repeatedly reflected between the resonator mirrors, and amplified light is emitted from the resonator mirrors as laser light. The laser light source 2 repeatedly emits pulsed laser light, for example, in a cycle from 500 Hz to 600 Hz. The laser light source 2 emits the laser light toward the attenuator 3.

The attenuator 3 attenuates incident laser light to adjust the laser light to have a predetermined energy density (ED). Such an attenuator 3 has a transmittance indicating a ratio of emitted laser light with respect to the incident laser light as a characteristic, and the transmittance is configured to be variable on the basis of a signal from the control device such as a Programmable Logic Controller (PLC). The attenuator 3 is provided in the middle of an optical path ranging from the laser light source 2 to the beam shaping optical system 5. The attenuator 3 attenuates the laser light emitted from the laser light source 2 in correspondence with the transmittance. An energy density (E) emitted from the attenuator 3 becomes a value ($E=E0\times T$) obtained by multiplying an energy density (E0) of the laser light emitted from the laser light source 2 by a transmittance (T) of the attenuator 3. The PLC (control device) specifies (derives) and changes the transmittance of the attenuator 3 so that the energy density emitted from the attenuator 3 is an optical energy density.

The polarization ratio control unit 4 is disposed on an emission side of the attenuator 3. The polarization ratio control unit 4, which is constituted by a ½ wavelength plate ($\lambda/2$ plate) and a polarization beam splitter, for example, changes a polarization ratio between a P-polarized wave and an S-polarized wave of incident laser light. That is, the polarization ratio of the laser light emitted from the attenuator 3 is changed by the polarization ratio control unit 4. The polarization ratio control unit 4 is configured to change (vary) the polarization ratio on the basis of a control signal output from the PLC (control device).

The laser light emitted from the polarization ratio control unit 4 is incident to the beam shaping optical system 5, and the beam shaping optical system 5 shapes the incident laser light to generate laser light with a beam shape suitable for irradiation of the separation layer 82. The beam shaping optical system 5 generates a line beam having a line shape along the Y-direction.

The beam shaping optical system 5 divides one beam into a plurality of beams (a plurality of line beams arranged in the Z direction), for example, by a homogenizer constituted by a lens array. After division into the plurality of beams, the beams are combined by a condenser lens to form a line beam shape. The beam shaping optical system 5 emits the generated (shaped) line-shaped laser light to the vertical reflecting mirror 61.

The vertical reflecting mirror 61, which is a rectangular reflection mirror extending in the Y direction, reflects the laser light, which corresponds to the plurality of line beams generated by the beam shaping optical system 5. For example, the vertical reflecting mirror 61 is a dichroic mirror and is a partial reflection mirror through which partial light is transmitted. The vertical reflecting mirror 61 generates reflected light by reflecting the line-shaped laser light and generates transmitted light by transmitting a part of the line-shaped laser light therethrough. The vertical reflecting mirror 61 irradiates the separation layer 82 on the substrate 81 with the laser light, which is the reflected light, and emits the laser light, which is transmitted light, for example, to a pulse measuring device such as a biplanar phototube 62 or the like.

The projection lens 63 is disposed above the substrate 81. The projection lens 63 has a plurality of lenses for projecting the laser light to the substrate 81, that is, the separation layer 82. The projection lens 63 condenses the laser light to the substrate 81. The laser light forms a line-shaped irradiated region along the Y-direction on the substrate 81. That is, on the substrate 81, the laser light becomes a line beam with the Y-direction set as a longitudinal direction. In addition, the laser light is emitted on the separation layer 82 while the work 8 (substrate 81) is conveyed in the +X direction. This makes it possible to irradiate, with the laser light, a strip-shaped region with the length of the irradiated region in the Y-direction set as a width.

The line beam-shaped laser light emitted to the vertical reflecting mirror 61 has a beam shape with a wide minor axis width. That is, after being emitted from the condenser lens, the minor axis width is slightly expanded and the beam shape is distorted. The laser light reflected by the vertical reflecting mirror 61 transmits the projection lens 63 to be shaped into line beam-shaped laser light having the minor axis width approximately ⅕ times.

The biplanar phototube 62, which is provided adjacent to the beam shaping optical system 5 at an end of the laser optical system 11, detects a pulse waveform of the laser light emitted from the laser light source 2 on the basis of the transmitted light having been transmitted through the vertical reflecting mirror 61. The biplanar phototube 62 outputs (transmits) the detected pulse waveform to the PLC (control device). The laser pulse energy of the laser light is derived based on the pulse waveform.

An imaging device 64 takes an image of the work 8 (substrate 81 and the separation layer 82) irradiated with laser light and outputs the taken image of the work 8 to the information processing device 9. The imaging device 64 includes a coaxial vertical line camera, for example. The coaxial vertical line camera (imaging device 64) is provided with a half mirror and an illumination device (coaxial vertical illumination) such as an LED as well as a line camera (camera body) and is so configured that the illumination reflected by the half mirror and the camera body are disposed coaxially. This allows a high contrast imaging between an illuminated part by the illumination from the illumination device such as LED or the like and an unilluminated part. In the present embodiment, the imaging device 64 is a coaxial vertical line camera though not limited thereto. The imaging device 64 may include a transmission line camera, a diffuse reflective line camera and a specular reflective line camera in addition to the coaxial vertical line camera and may be composed of these different types of line cameras.

The information processing device 9, which is communicably connected to the imaging device 64, performs processing of acquiring an image of the work 8 output from the imaging device 64, outputting information on the state of the separation layer 82 of the work 8 based on the acquired image of the work 8 and determining whether or not the separation layer 82 is successfully separated on the basis of the information. That is, the information processing device 9 functions as a main device consisting of a separation observation monitoring system for automatically determining whether or not the separation layer 82 on the substrate is separated by the laser lift-off device 1.

The information processing device 9 is an information processing device such as an edge computer, a personal computer, a server or the like and may be a device (control device) functioning as a control panel or a PLC (Programmable Logic Controller) for controlling the operation of the laser lift-off device 1 at the same time. Alternatively, the PLC or the like for controlling the operation of the laser lift-off device 1 may be provided as a separate device from the information processing device 9, and the information processing device 9 may be communicably connected to the PLC (control device) or the like via a communication unit 93. In this case, the information processing device 9 is a cloud server connected to an external network such as the Internet, and may function as a central server that communicates with the laser lift-off devices 1 (imaging devices 64, PLCs) installed at multiple manufacturing sites and extract information on the states of the separation layers 82 by the LLO processes performed by the multiple laser lift-off devices 1.

The information processing device 9 includes a processing unit 91, a storage unit 92, the communication unit 93 and an input/output I/F 94, and communicates with the imaging device 64 and the PLC or the like via the communication unit 93 or the input/output I/F 94.

The processing unit 91, which includes arithmetic operation devices with a time measurement function such as one or a plurality of central processing units (CPUs), microprocessing units (MPUs) and graphics processing units (GPUs), reads out and executes a program P (program product) stored in the storage unit 92 to function as a control unit that performs control or processing based on the image (image of the work 8) taken by the imaging device 64.

The storage unit 92 includes a volatile storage region such as a static random access memory (SRAM), a dynamic random access memory (DRAM) and a flash memory, and a non-volatile storage region such as an EEPROM and a hard disk. The storage unit 92 stores in advance the program P (program product) and data to be referred to during processing. The program P stored in the storage unit 92 may be a program P (program product) that is read out from a recording medium readable by the processing unit 91 and stored. Alternatively, the program P may be a program (program product) that is downloaded from an external computer (not illustrated) connected to a communication network (not illustrated) and is stored in the storage unit 92. The storage unit 92 may store an actual state file of a learning model 913, which is described later, as a module of the program P, for example.

For example, the communication unit 93 is a communication module or a communication interface conforming to an Ethernet (registered trademark) standard, for example, and an Ethernet cable is connected to the communication unit 93. The communication unit 93 is not limited to a case of a wire such as the Ethernet cable, and may be, for example, a communication interface complying with radio communication such as a short range radio communication module such as Wi-Fi (registered trademark) and Bluetooth (registered trademark), or a wide range radio communication module such as 4G and 5G.

For example, the input/output I/F 94 is a communication interface conforming to a communication standard such as RS232C and a USB. A peripheral device including an input device such as a keyboard or a display device 941 such as a liquid crystal monitor is connected to the input/output I/F 94. The information processing unit 91 of the information processing device 9 is communicably connected to the imaging device 64 via the input/output I/F 94 or the communication unit 93.

Figure 3:
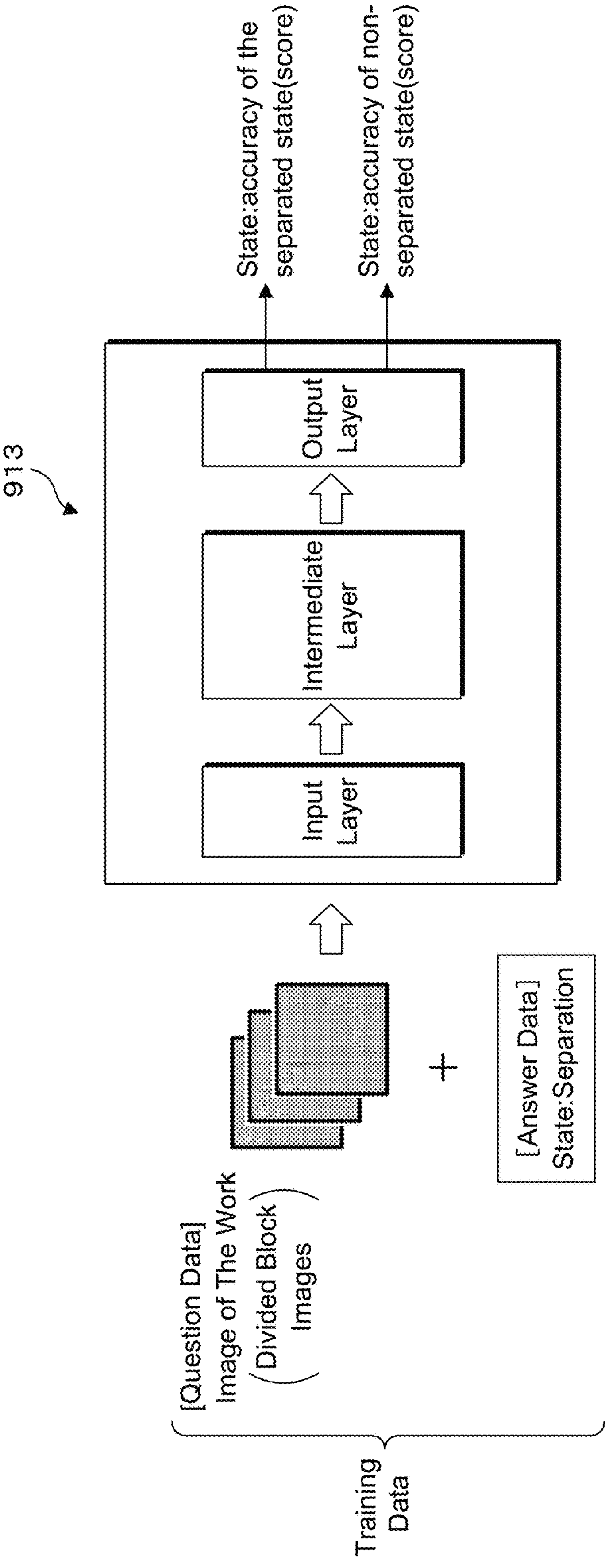
FIG. 3 illustrates an example of a learning model (separation state determination model).

FIG. 3 illustrates an example of the learning model (separation state determination model) 913. The learning model 913, which is structured by the CNN (Convolution Neural Network) or the like and is a neural network (NN) that outputs information on the state of the separation layer 82 of the work 8 included in the input image, functions as a separation state determination model.

The image of the work 8 to be input to the learning model (separation state determination model) 913 may be divided into block images of a predetermined size. In other words, the image of the work 8 (separation layer 82) taken by the imaging device 64 may be divided into images of a predetermined size as a pre-processing performed before the learning model (separation state determination model) 913 is used, and then the divided block images may be input to the learning model 913. Alternatively, the image of the work 8 (separation layer 82) taken by the imaging device 64 may be input to the learning model 913 without pre-processing such as dividing.

The learning model (separation state determination model) 913 can be generated by preparing training data that associates the image (question data) of the work 8 (separation layer 82) and information (answer data) on the state (separated state or non-separated state) of the separation layer 82 and machine-training an untrained neural network with the training data. The image of the work 8 is sequentially stored by the data logger, for example, as operation history data when the laser lift-off device 1 is implemented. The information on the state of the separation layer 82 can be obtained by aggregating the quality confirmation results of products that have undergone the LLO process. By using these data, the training data for the learning model (separation state determination model) 913 can be generated.

When generating (training) the learning model (separation state determination model) 913, a model already trained to function as a classifier may be used and be subjected to transfer learning or fine-tuning using the above-mentioned training data specific to the separation layer 82 of the work 8. Data sets of question data and answer data that are included in the training data for training the learning model 913 or the like are synonymous with data sets of input data and output data to be used for the learning model 913 or the like. Thus, the definition in one of the data sets may naturally be applied to the other one of the data sets.

The neural network (separation state determination model) trained with the training data is assumed to be used as a program module that is a part of artificial intelligence software. The learning model (separation state determination model) 913 is used by the information processing device 9 having the processing unit 91 and the storage unit 92 as described above and is executed by the information processing device 9 having computing power to thereby structure a neural network system. That is, the processing unit 91 of the information processing device 9 performs arithmetic computation for extracting the features of an image of the work 8 (separation layer 82) input to an input layer in accordance with the instructions from the learning model (separation state determination model) 913 stored in the storage unit 92 and outputs information on the state of the separation layer 82 from an output layer.

The learning model (separation state determination model) 913 has an input layer that accepts the input of an image, an output layer that outputs information on the state of the separation layer 82 of the work 8 included in the image and an intermediate layer that extracts image features of the image. The input layer includes a plurality of neurons that accept inputs of pixel values of the respective pixels included in an image and delivers the input pixel values to the intermediate layer. The intermediate layer has a plurality of neurons that extract image features of an image and delivers the extracted features of the image to the output layer. In the case where the learning model (separation state determination model) 913 is a CNN, the intermediate layer, which has convolution layers and pooling layers that are alternately coupled, each convolution layer convolving the pixel values of the respective pixels input from the input layer and each pooling layer mapping the pixel values convoluted in the convolution layer, compresses the pixel information of the image and finally extracts the features of the image. The output layer has one or a plurality of neurons that output information on the state of the separation layer 82 of the work 8 and outputs information on the state of the separation layer 82 based on the image features output from the intermediate layer.

In the present embodiment, the output layer is composed of a softmax layer as one example and has two neurons (nodes) corresponding to the states of the separation layer 82 of the work 8. The state of the separation layer 82 includes a separated state and a non-separated state, for example. From the neuron corresponding to the separated state, accuracy (score) indicating that the separation layer 82 is in a separated state (separation success) is output while from the neuron corresponding to the non-separated state, accuracy (score) indicating that the separation layer 82 is in a non-separated state (separation failure) is output. The accuracy may be indicated as a value ranging from 0 to 1 with a predetermined number of significant figures (e.g., 0.00 to 1.00 in the case of the significant figures to the second decimal place).

Alternatively, the learning model 913 may output only the accuracy (score) indicating that the state of the separation layer 82 included in the input block image is in the separated state (separation success). Alternatively, the learning model 913 may output binary information indicating whether the state of the separation layer 82 included in the input block image is in a separated state or a non-separated state (separated state: 1, non-separated state: 0).

The learning model (separation state determination model) 913 described here outputs a value (score) indicating accuracy of the separated state and the non-separated state as information on the state of the separation layer 82, though not limited thereto. The learning model (separation state determination model) 913 may output values (percentages) indicating the accuracy (score) of a separated state, a non-separated state and a soot (ash) occurring state as information on the state of the separation layer 82 of the work 8 if receiving input of an image of the work 8. Here, it goes without saying that the training data for training the learning model 913 includes images of the soot occurring state in addition to images of the separated state or the non-separated state. The output layer of the learning model (separation state determination model) 913 consists of a softmax layer including three neurons corresponding to the separated state, the non-separated state and the soot occurring state (ash). From each neuron, the accuracy (score) of the state of the corresponding separation layer 82 is output. This makes it possible to specify whether the separation layer 82 of the work 8 included in each of the divided block images is in the separated state, the non-separated state or the soot occurring state (ash). The processing unit 91 (control unit) of the information processing device 9 specifies the state of the separation layer 82 for each of the block images to thereby specify the region of the separated state, the non-separated state or the soot occurring state for all the regions of the separation layer 82 in the entirety of the work 8 (substrate).

Alternatively, the learning model (separation state determination model) 913, which is composed of RCNN (Regions with Convolutional Neural Network (NN)), Fast RCNN, Faster RCNN or SSD (Single Shot Multibox Detector), YOLO (You Only Look Once) or the like, may be a neural network (NN) that performs object detection, semantic segmentation or instance segmentation. Here, the learning model (separation state determination model) 913 exerts an object extraction function for the image of the work 8, to thereby specify the region of the separation layer 82 that is in the separated state, the non-separated state or the soot occurring state in the entirety of the work 8.

Though the learning model (separation state determination model) 913 is assumed as CNN or the like in the present embodiment, the type of the learning model is not limited thereto. The learning model 913 may be constructed by learning algorithms such as a transformer, BERT, GPT, a Recurrent Neural Network (RNN), a Long-short term model (LSTM), CNN, a Support Vector Machine (SVM), a Bayesian network, linear regression, a regression tree, multiple regression, random forest and ensemble other than the CNN.

Figure 4:
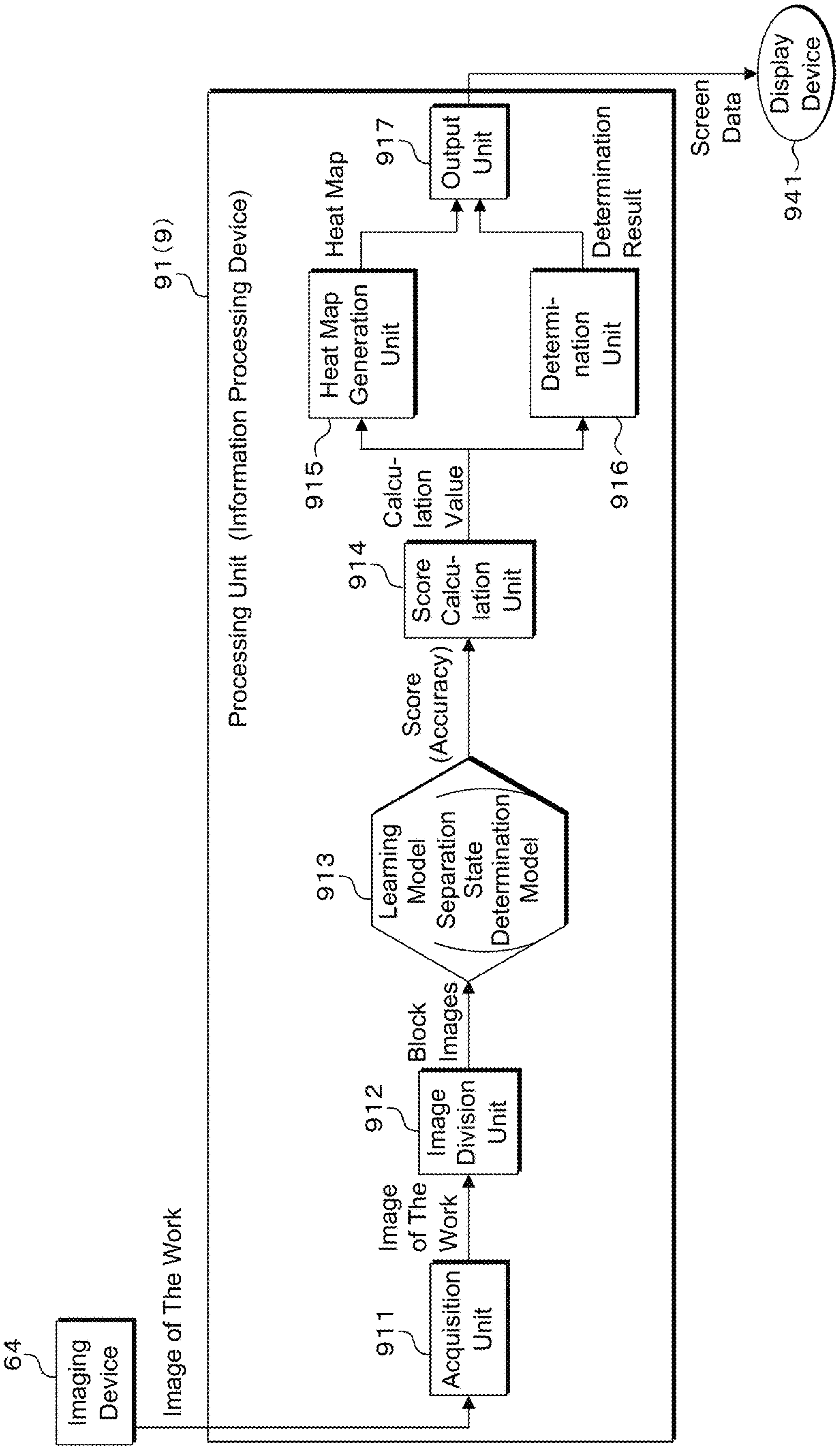
FIG. 4 is a functional block diagram illustrating functional parts contained in a processing unit (control unit) of the information processing device.

FIG. 4 is a functional block diagram illustrating functional parts included in the processing unit 91 (control unit) of the information processing device 9. The processing unit 91 of the information processing device 9 executes the program P stored in the storage unit 92 to function as an acquisition unit 911, an image division unit 912, a learning model 913, a score calculation unit 914, a heat map generation unit 915, a determination unit 916 and an output unit 917.

The acquisition unit 911 acquires an image of the work 8 output from the imaging device 64. The image of the work 8 includes the separation layer 82 formed on the substrate 81 of the work 8. The acquisition unit 911 outputs the acquired image to the image division unit 912. In the case where images of the work 8 are output sequentially from the imaging device 64 at a predetermined cycle, for example, the acquisition unit 911 may output the images sequentially acquired to another functional part such as an image division unit 912 to perform continuous processing on the images taken at a predetermined cycle.

The image division unit 912 divides the image of the work 8 output from the acquisition unit 911 into images of a predetermined size to generate block images, which generates multiple block images from an image of the work 8. The image division unit 912 may perform compression processing on the generated block images.

The image division unit 912 may assign a number (image number) indicating the position of a block image to each of the generated (divided) block images. For example, the image number is set by combining the vertical address and the horizontal address of a block image in the image of the work 8. These addresses may be stored in an array variable so as to be applied to (associated with) each of the block images. By using the image number, the divided block images can be aggregated to reconstruct the image of the work 8. The image division unit 912 inputs each of the generated block images to the learning model (separation state determination model) 913. In the case where the processing unit 91 of the information processing device 9 contains a GPU with parallel processing function, the image division unit 912 may perform, in parallel, input of the block image to the learning model 913 and estimation with the learning model 913.

The learning model (separation state determination model) 913 outputs information on the state of the separation layer 82 included in the block image on the basis of each of the input block images. As described above, the learning model 913 outputs accuracy (score) indicating that the state of the separation layer 82 included in the input block image is the separated state (separation success) and accuracy (score) indicating that it is the non-separated state (separation failure). Alternatively, the learning model 913 may only output accuracy (score) indicating that the state of the separation layer 82 included in the input block image is the separated state (separation success). Alternatively, the learning model 913 may output binary information indicating whether the separation layer 82 included in the input block image is the separated state or the non-separated state. The learning model 913 outputs the estimated information on the state of the separation layer 82 to the score calculation unit 914.

The score calculation unit 914 functions as a separation ratio calculation unit that calculates a separation ratio for the work 8 on the basis of the information on the state of the separation layer 82 for each of the block images that is output from the learning model 913. If 100 block images are generated from a single image of the work 8, for example, each of these block images is assigned (associated) with an accuracy (score) indicating that it is in the separated state (separation success). If the accuracy is indicated as a value ranging from 0 to 1 consisting of a predetermined number of significant figures, for example, the accuracy of all the block images is aggregated (summed up) to calculate the accuracy of the separated state (separation success) in the entire work 8 (the entirety of the separation layer 82). If the learning model 913 estimates that the separation layer 82 included in the block image is completely separated, the accuracy (score) is 1, and the accuracy approaches 0 as the degree of separation decreases. The score calculation unit 914 calculates a separation ratio for the work 8 by dividing a sum-up value obtained by summing up the accuracy (accuracy indicating the separated state (separation success)) of all the block images by the number of block images. For example, if the accuracy of all the block images is 1, the separation ratio for the work 8 is 1 (100%). The score calculation unit 914 outputs the calculated separation ratio to the determination unit 916.

The score calculation unit 914 maps the accuracy assigned to the block images on the locations of the respective images to calculate distribution data representing the distribution of accuracy of the separated state (separation success) over the entirety of the work 8. The score calculation unit 914 outputs the calculated distribution data to the heat map generator unit 915. By dividing the image of the work 8 into multiple block images and deriving the accuracy indicating the separated state (separation success) for each block image, a region of the non-separated state (separation failure) partially occurring in the entirety of the work 8 (the entirety of the separation layer 82) can efficiently be specified.

The heat map generation unit 915 generates a heat map that visualizes the distribution of the accuracy indicating the separated state (separation success) in the entirety of the work 8 based on the distribution data output from the score calculation unit 914. In this heat map, the higher the accuracy of the separated state (separation success) is, the higher the color saturation of red may be, while the lower the accuracy of the separated state (separation success) is (the higher the accuracy of the non-separated state (separation failure) is high), the higher the color saturation of blue may be. The heat map generation unit 915 may further perform annotation display such that an object such as a frame representing the region of the non-separated state is superimposed on the heat map.

The determination unit 916 determines whether or not separation at the separation layer 82 at the work 8 is successfully performed on the basis of the separation ratio output from the score calculation unit 914. The storage unit 92 of the information processing device 9 stores in advance a reference value for determining whether or not separation of the separation layer 82 at the work 8 is successfully performed. The determination unit 916 contrasts or compares the predetermined reference value thus stored in advance with the separation ratio of the work 8 to determine whether or not separation of the separation layer 82 at the work 8 is successfully performed. The predetermined reference value is set to 0.99 (99%), for example. The determination unit 916 determines that separation of the separation layer 82 is successfully performed in the LLO process if the separation ratio for the work 8 is equal to or higher than the reference value, and determines that separation of the separation layer 82 is not successfully performed (separation failure occurs) if the separation ratio for the work 8 is lower than the reference value.

The output unit 917 generates a management screen (screen data), which is described later using the heat map from the heat map generation unit 915, the determination result from the determination unit 916 and the image of the work 8 from the acquisition unit 911, and outputs the generated management screen (screen data) to the display device 941, for example.

Figure 5:
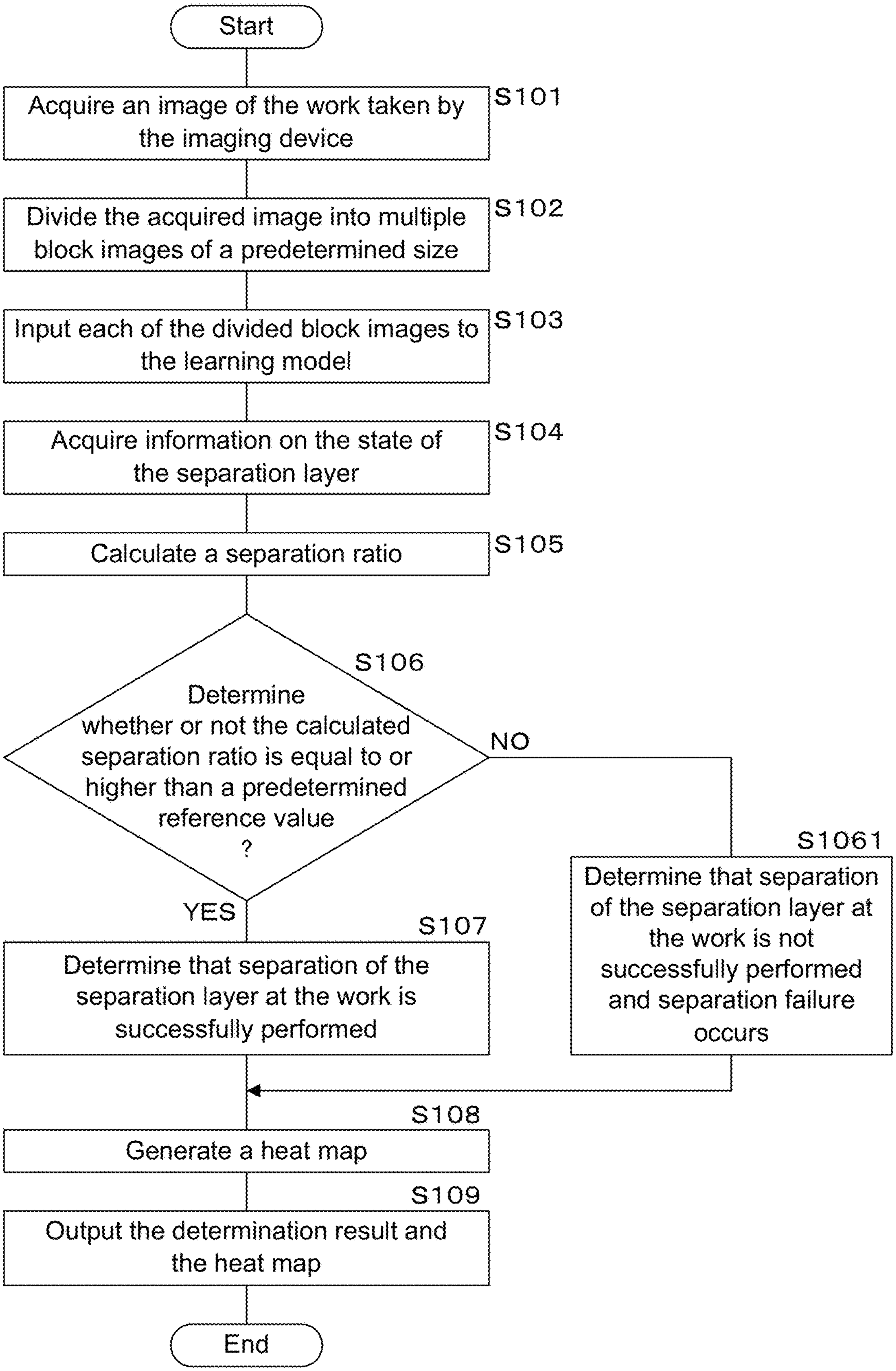
FIG. 5 is a flowchart illustrating an example of a processing procedure to be performed by the processing unit.

FIG. 5 is a flowchart illustrating an example of a processing procedure to be performed by the processing unit 91. The processing unit 91 of the information processing device 9 accepts operator's operation with a keyboard or the like connected to, for example, an input/output, and performs the following processing on the basis of the accepted operation.

The processing unit 91 of the information processing device 9 acquires an image of the work 8 taken by the imaging device 64 (S101). The processing unit 91 of the information processing device 9 divides the acquired image into multiple block images of a predetermined size (S102). The processing unit 91 of the information processing device 9 divides the acquired image of the work 8 into the block images of the predetermined size to generate multiple block images. The processing unit 91 of the information processing device 9 may assign an image number to each of the divided block images.

The processing unit 91 of the information processing device 9 inputs each of the divided block images to the learning model (separation state determination model) 913 (S103). The processing unit 91 of the information processing device 9 acquires information on the state of the separation layer 82 output from the learning model (separation state determination model) 913 (S104). The processing unit 91 of the information processing device 9 inputs the divided block images in order or in parallel to the learning model (separation state determination model) 913 and acquires information on the state of the separation layer 82 output from the learning model 913. The information on the state of the separation layer 82 includes accuracy (score) indicating that the state of the separation layer 82 included in the block image is the separated state (separation success). The accuracy (score) may be 1 if the separation layer 82 included in the block image is estimated to be fully separated and may approach 0 as the degree of separation decreases.

The processing unit 91 of the information processing device 9 calculates a separation ratio based on the acquired information on the state of the separation layer 82 (S105). The processing unit 91 of the information processing device 9 calculates a separation ratio for the work 8 by dividing a sum up value obtained by summing up the accuracy (accuracy indicating that each block image is the separated state (separation success)) of all the block images by the number of block images. For example, the separation ratio for the work 8 is 1 (100%) if the accuracy of all the block images is 1 while the region where the separation failure occurs increases as the separation ratio decreases (approaches 0).

The processing unit 91 of the information processing device 9 determines whether or not the calculated separation ratio is equal to or higher than a predetermined reference value (S106). The processing unit 91 of the information processing device 9 determines whether or not separation of the separation layer 82 at the work 8 is successfully performed based on the predetermined reference value (e.g., 0.99) stored in the storage unit 92 in advance, for example.

If the separation ratio is equal to or higher than the predetermined reference value (S106: YES), the processing unit 91 of the information processing device 9 determines that separation of the separation layer 82 at the work 8 is successfully performed (S107). If the separation ratio is not equal to or higher than the predetermined reference value (S106: NO), that is, if the separation ratio is lower than the predetermined reference value, the processing unit 91 of the information processing device 9 determines that separation of the separation layer 82 at the work 8 is not successfully performed and separation failure occurs (S1061).

The processing unit 91 of the information processing device 9 generates a heat map on the basis of the acquired information on the state of the separation layer 82 (S108). The processing unit 91 of the information processing device 9 maps the accuracy assigned to each of the block images on the positions of the respective block images to calculate distribution data representing the distribution of the accuracy including the separated state (separation success) in the entirety of the work 8 and generates a heat map using the distribution data.

The processing unit 91 of the information processing device 9 outputs the determination result and the heat map (S109). The processing unit 91 of the information processing device 9 generates a management screen (screen data) for displaying the heat map and the determination result and outputs the generated management screen (screen data) to the display device 941 or the mobile terminal of the manager of the laser lift off device 1 to thereby display the management screen on the display device 941 or the mobile terminal.

Figure 6:
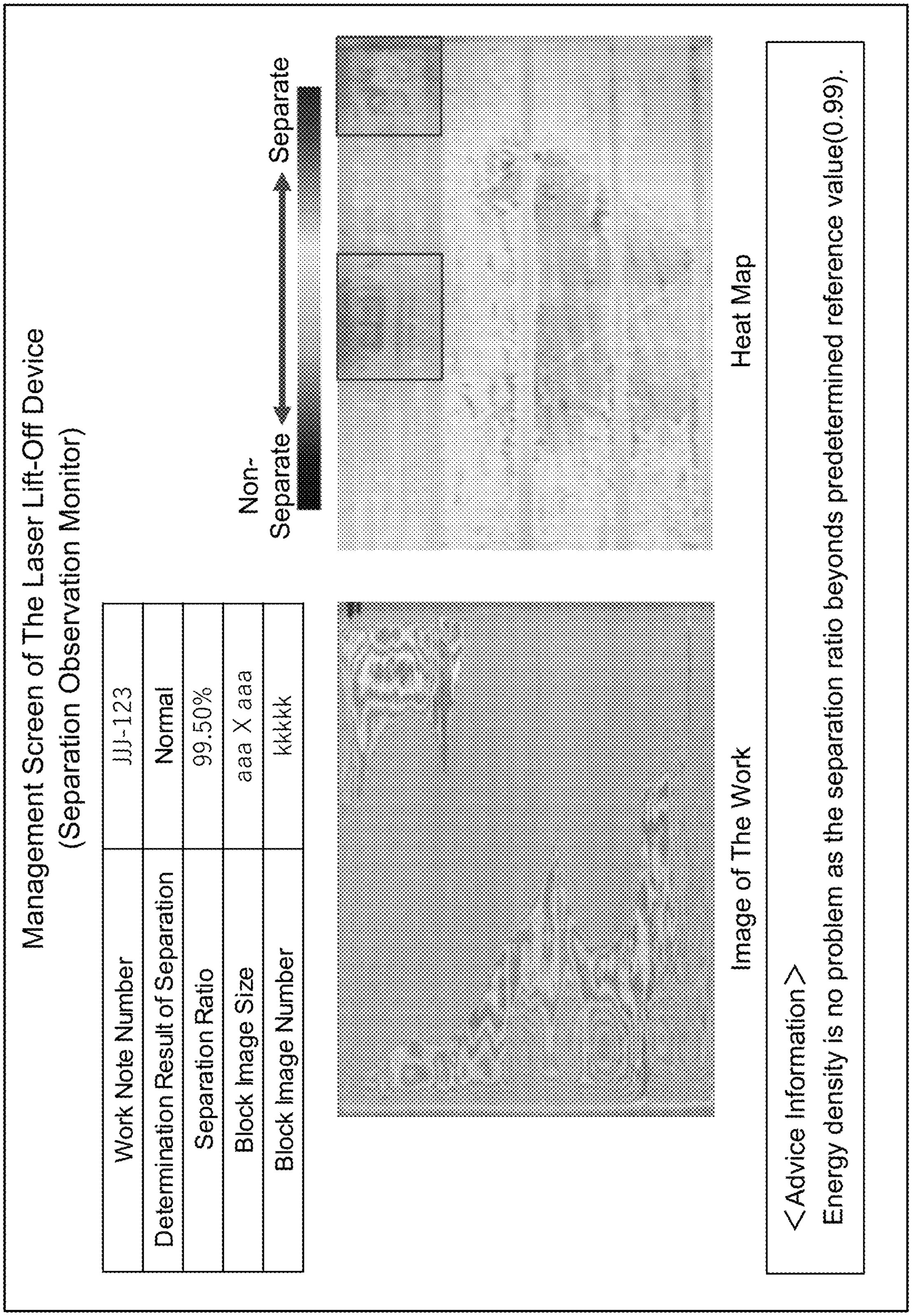
FIG. 6 illustrates an example of a management screen of the laser lift-off device.

FIG. 6 illustrates an example of the management screen of the laser lift off device 1. The management screen of the laser lift-off device 1 includes, for example, a list display area displaying determination results of separation in a list, a work 8 image display area displaying an image of the work 8, a heat map image display area displaying an image of a heat map and an advice display area displaying advice information corresponding to the determination result of the separation.

In the list display area, the display fields are placed for displaying a work note number, a determination result of separation, a separation ratio, the size of a block image (block image size) and the number of block images (block image number) in which matters related to the LLO process are described in using the laser lift-off device 1.

The work 8 image display area may be arranged side by side with the heat map image display area to facilitate comparison between the image (real image) of the wok 8 taken by the imaging device 64 and the separation degree in each region of the entire work 8, which improves visibility by the manager or the like of the laser lift-off device 1. An object such as a red frame may be superimposed onto a region determined as having a low separation degree, i.e. a non-separated state region, to attract attention to the manager or the like.

In the advice display area, advice (comment) derived based on the determination result of separation is displayed. The storage unit 92 of the information processing device 9 stores the details of the advice corresponding to the contents of the determination result of separation in a table form, for example. The processing unit 91 of the information processing device 9 may derive advice according to the determination result of separation by referring to the table.

According to the present embodiment, the information processing device 9 (processing unit 91) inputs an image of the work 8 taken by the imaging device 64 to the learning model (separation state determination model) 913 to derive information on the state of the separation layer 82 of the work 8. In the LLO (Laser Lift-off) process of irradiating the work 8 with laser light to separate the separation layer 82, the use of the learning model (separation state determination model) 913 enables efficient derivation of information on the state of the separation layer 82. The state of the separation layer 82 may include a separated state where the separation layer 82 is successfully separated, a non-separated state occurring when the energy density (ED) of laser light (line beam) is low and a soot occurring state (ash) occurring when the energy density (ED) thereof is high. If receiving an input of the image of the work 8, the learning model 913 outputs (estimates) whether or not the state of the separation layer 82 of the work 8 is the separated state, the non-separated state or the soot occurring state, which can efficiently derive the more detailed information on the state of the separation layer 82. The information processing device 9 (processing unit 91) outputs the derived information on the state of the separation layer 82 and the acquired image (the image of the work 8 taken by the imaging device 64) that are associated with each other and outputs the associated information to the display device 941 or the like connected to the information processing device 9, for example, which can efficiently inform the operator of the laser lift-off device 1 of the information on the state of the separation layer 82.

According to the present embodiment, the information processing device 9 (processing unit 91) determines whether or not separation at the separation layer 82 is successfully performed on the basis of the information on the state of the separation layer 82 output from the learning model 913, which enables efficient determination as to the separated state or the non-separated state in the LLO process. The information processing device 9 (processing unit 91) specifies the information on a region (separation region) indicating the separated part where the separation layer 82 is successfully separated based on the information on the state of the separation layer 82. The information processing device 9 (processing unit 91) calculates, as a separation ratio, a ratio of the area of the separated part to the area of the entire substrate 81 (the entirety of the separation layer 82 formed on the substrate 81), and determines that the separation state is successful if the separation ratio (area ratio) is equal to or higher than 99% (0.99), for example and determines that the separation state is unsuccessful (separation failure) if the separation ratio is lower than 99%. The use of the separation ratio calculated based on the information on the state of the separation layer 82 enables efficient determination as to whether or not separation at the separation layer 82 is successfully performed.

According to the present embodiment, the information processing device 9 (processing unit 91) inputs, to the learning model 913, multiple block images obtained by dividing the image obtained from the imaging device 64 into images of a predetermined size and derives information on the state of the separation layer 82 for each of the block images. The learning model 913 outputs information on the state of the separation layer 82 included in the block image for each of the input multiple block images, which can improve accuracy of the output information in comparison with the case where the entire image acquired from the imaging device 64 is input to the learning model 913. Moreover, accuracy indicating the separated state (separation success) is derived for each of the block images, which can efficiently specify the region of the non-separated state (separation failure) where partially occurs in the entirety of the work 8 (the entirety of the separation layer 82).

According to the present embodiment, the information processing device 9 (processing unit 91) generates and outputs a heat map representing the state distribution of the separation layer of the work 8 on the basis of the information on the state of the separation layer 82 for each of the block images, which improves viewability when the operator or the like of the laser lift-off device 1 grasps the separation state of the entire separation layer 82 of the work 8. In addition, an object such as frame indicating the region of the non-separated state is superimposed on the heat map, which allows the operator or the like of the laser lift-off device 1 to efficiently be informed of the non-separated state.

Second Embodiment

Figure 7:
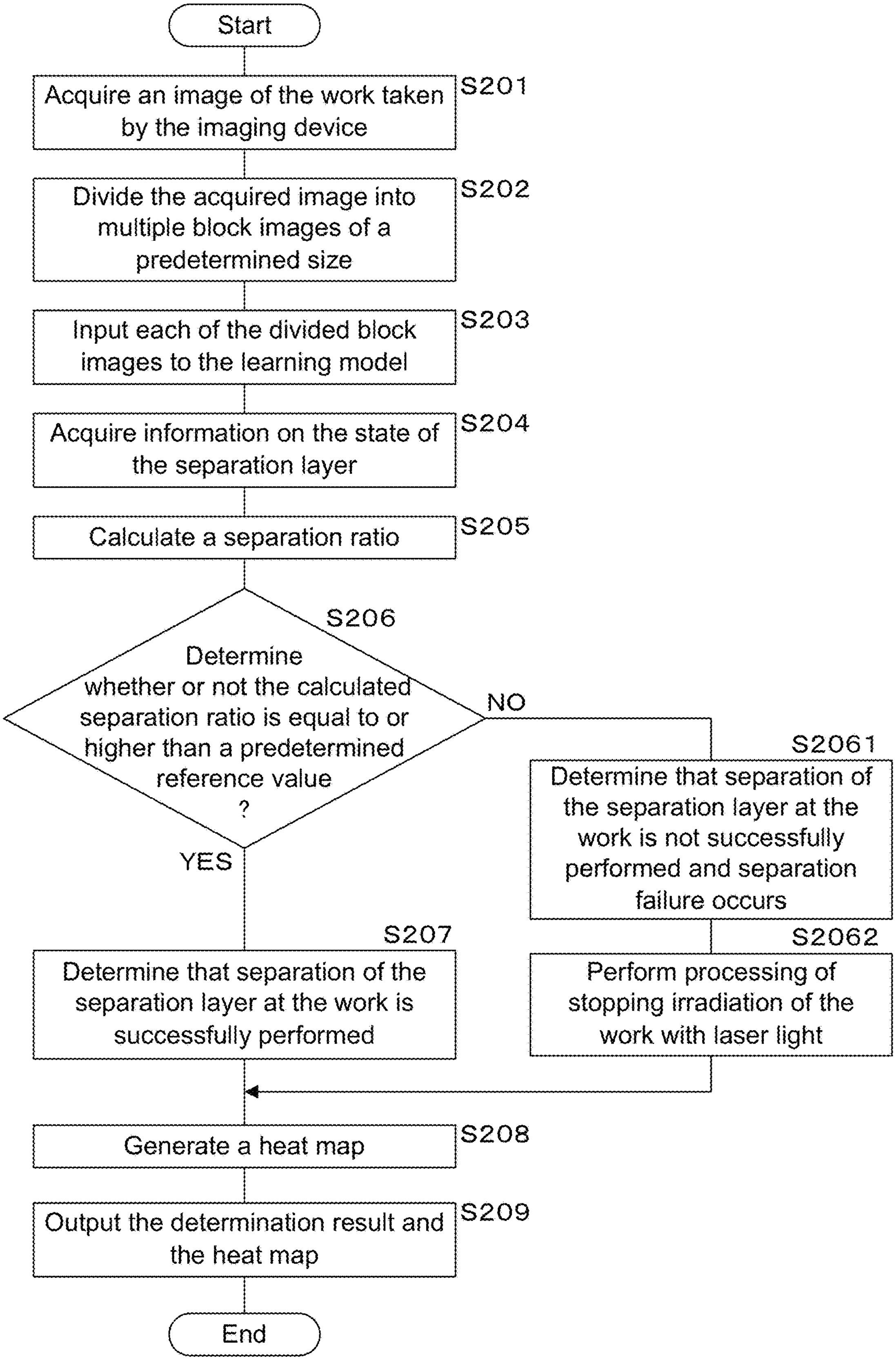
FIG. 7 is a flowchart illustrating an example of a processing procedure to be performed by the processing unit according to a second embodiment (measure control for separation failure).

FIG. 7 is a flowchart illustrating an example of a processing procedure to be performed by the information processing device 9 according to a second embodiment (measure control for separation failure). The processing unit 91 of the information processing device 9 accepts operation by the operator with a keyboard or the like connected to, for example, an input/output, and performs the following processing on the basis of the accepted operation.

The processing unit 91 of the information processing device 9 acquires an image of the work 8 taken by the imaging device 64 (S201). The processing unit 91 of the information processing device 9 divides the acquired image into multiple block images of a predetermined size (S202). The processing unit 91 of the information processing device 9 inputs each of the divided block images to the learning model 913 (separation state determination model) (S203). The processing unit 91 of the information processing device 9 acquires information on the state of the separation layer 82 output by the learning model (separation state determination model) 913 (S204). The processing unit 91 of the information processing device 9 calculates a separation ratio on the basis of the acquired information on the state of the separation layer 82 (S205). The processing unit 91 of the information processing device 9 determines whether or not the calculated separation ratio is equal to or higher than a predetermined reference value (S206). If the separation ratio is equal to or higher than the predetermined reference value (S206: YES), the processing unit 91 of the information processing device 9 determines that separation of the separation layer 82 at the work 8 is successfully performed (S207). The processing unit 91 of the information processing device 9 performs the processing from S201 to S207 as in the processing from S101 to S107 in the first embodiment.

If the separation ratio is not equal to or higher than the predetermined reference value (S206: NO), that is, if the separation ratio is lower than the predetermined reference value, the processing unit 91 of the information processing device 9 determines that separation of the separation layer 82 at the work 8 is not successfully performed and separation failure occurs (S2061). The processing unit 91 of the information processing device 9 performs the processing of 2061 as in the processing of 1061 in the first embodiment.

The processing unit 91 of the information processing device 9 performs processing of stopping irradiation of the work 8 with laser light (S2062). If determining that the separation ratio is lower than the predetermined reference value and separation failure occurs, the processing unit 91 of the information processing device 9 stops irradiation of the work 8 with laser light by outputting a process stop signal to the laser lift-off device 1 or the PLC (Programmable Logic Controller) for controlling the laser lift-off device 1 and stops manufacture. This can prevent the substrate 81 with separation failure from being produced in the subsequent manufacture.

The countermeasure when separation failure occurs may be performed by changing the energy density of the laser light emitted onto the work 8, not limited to stopping irradiation of the work 8 with laser light. If determining that the separation ratio is lower than the predetermined reference value and that separation failure occurs, the processing unit 91 of the information processing device 9 may change the energy density of the laser light emitted onto the work 8 depending on the type of the separation failure, that is, whether the separation failure is caused by being not separated (non-separated state) or by occurrence of soot (ash).

In the case where the learning model (separation state determination model) 913 outputs (estimates) the accuracy (score) of the separated state, the non-separated state and the soot occurring state) on the basis of the input images of the work 8 (divided block images), the processing unit 91 of the information processing device 9 specifies the state of the separation layer 82 on the basis of the output result from the learning model 913. In other words, if determining that the separation ratio is lower than the predetermined reference value and that separation failure occurs, the separation failure is caused by either the non-separated state or the soot occurring state. If determining that separation failure occurs, the processing unit 91 of the information processing device 9 specifies the state of the separation layer 82 is the non-separated state or the soot occurring state based on the output result from the learning model 913.

If the state of the separation layer 82 is specified as the non-separated state, the processing unit 91 of the information processing device 9 increases the energy density of the laser light emitted onto the work 8. If the state of the separation layer 82 is specified as the soot occurring state, the processing unit 91 of the information processing device 9 reduces the energy density of the laser light emitted onto the work 8. The processing unit 91 of the information processing device 9 may increase or reduce the energy density by increasing or reducing the transmittance of the attenuator 3 or increasing or reducing the output by the laser light source 2, for example. Changing (increasing or reducing) the energy density of the laser light depending on the state of the separation layer 82 can enhance yield of the substrate.

The processing unit 91 of the information processing device 9 generates a heat map on the basis of the acquired information on the state of the separation layer 82 (S208). The processing unit 91 of the information processing device 9 outputs the determination result and the heat map (S209). If determining that separation failure occurs, in outputting the determination result and the heat map, the processing unit 91 of the information processing device 9 may output the information indicating that irradiation of the laser light is stopped together with the determination result and the heat map. The processing unit 91 of the information processing device 9 performs processing from S208 to S209 as in the processing from S108 to 109 in the first embodiment.

According to the present embodiment, if determining that the separation state is not successful, that is, separation failure occurs without separation at the separation layer 82 not being successfully performed, the information processing device 9 (processing unit 91) performs processing of stopping irradiation of the work 8 with the laser light such as outputting a process stop signal to the laser lift-off device 1 or the PLC for controlling the laser lift-off device 1. This can prevent a product with separation failure from being manufactured.

The embodiments disclosed herein are illustrative in all respects and should be considered not to be restrictive. Technical characteristics described in the respective embodiments can be combined with each other, and the scope of the invention is intended to include all modifications within a scope of the appended claims and a scope equivalent to the scope of the appended claims. Further, it is to be noted that, as used herein and in the appended claims, the singular forms “a”, “an”, and “the” include plural referents unless the context clearly dictates otherwise.

DESCRIPTION OF REFERENCE NUMERALS

1 laser lift-off device
11 laser optical system
2 laser light source
3 attenuator
4 polarization ratio control unit
5 beam shaping optical system
61 vertical reflecting mirror
62 biplanar phototube
63 projection lens
64 imaging device (coaxial vertical line camera)
7 laser irradiation chamber
71 stage
72 base
8 work
81 substrate
82 separation layer
9 information processing device
91 processing unit
911 acquisition unit
912 image division unit
913 learning model (separation state determination model)
914 score calculation unit
915 heat map generation unit
916 determination unit
917 output unit
92 storage unit
920 recording medium
P program (program product)
93 communication unit
94 input/output I/F.
941 display device

The invention claimed is:

1. A laser lift-off device irradiating a work having a substrate and a separation layer formed on the substrate with laser light to separate the separation layer from the substrate, comprising:

an imaging device that takes an image of the work irradiated with laser light; and a processing unit that performs processing based on an image taken by the imaging device, wherein the processing unit:

acquires an image of a work taken by the imaging device, inputs the acquired image of the work to a learning model that, if an image of a work is input, outputs information related to a state of a separation layer of the work, to derive information related to a state of the separation layer, outputs derived information related to the state of the separation layer, determines whether or not separation at the separation layer is successfully performed on the basis of the derived information related to the state of the separation layer, and outputs a result of the determination, wherein the information related to the state of the separation layer includes information on a region of a separated part indicating a part where the separation layer is separated, and the processing unit:

calculates an area ratio of the separated part to an area of the substrate, determines that a separation state is successful if the calculated area ratio is equal to or higher than a predetermined ratio, and determines that a separation state is unsuccessful if the calculated area ratio is lower than a predetermined ratio, wherein the processing unit performs processing of stopping irradiation of the work with laser light in a case where it is determined that the separation state is unsuccessful.

2. The laser lift-off device according to claim 1, wherein the state of the separation layer includes at least one of a separated state, a non-separated state and a soot occurring state.

3. The laser lift-off device according to claim 1, wherein the processing unit outputs the information related to the state of the separation layer in association with an image acquired from the imaging device.

4. The laser lift-off device according to claim 1, wherein the processing unit:

divides an image acquired from the imaging device into a plurality of block images of a predetermined size, and inputs each of the divided block images into the learning model to derive information related to a state of a separation layer for each of the block images.

5. The laser lift-off device according to claim 4, wherein the processing unit:

generates a heat map indicating state distribution of the separation layer at the work on the basis of the derived information related to the state of the separation layer for each of the block images, and outputs the generated heat map.

6. The laser lift-off device according to claim 5, wherein the processing unit outputs an object indicating a region of the non-separated state such that the object is superimposed on the heat map in the state distribution of the separation layer represented by the heat map.

7. The laser lift-off device according to claim 1, wherein the imaging device includes a coaxial vertical line camera.

8. A laser lift-off device irradiating a work having a substrate and a separation layer formed on the substrate with laser light to separate the separation layer from the substrate, comprising:

an imaging device that takes an image of the work irradiated with laser light; and a processing unit that performs processing based on an image taken by the imaging device, wherein the processing unit:

acquires an image of a work taken by the imaging device, inputs the acquired image of the work to a learning model that, if an image of a work is input, outputs information related to a state of a separation layer of the work, to derive information related to a state of the separation layer, outputs derived information related to the state of the separation layer, divides an image acquired from the imaging device into a plurality of block images of a predetermined size, inputs each of the divided block images into the learning model to derive information related to a state of a separation layer for each of the block images, generates a heat map indicating state distribution of the separation layer at the work on the basis of the derived information related to the state of the separation layer for each of the block images, and outputs the generated heat map.

* * * * *